UNITED STATES PATENT OFFICE.

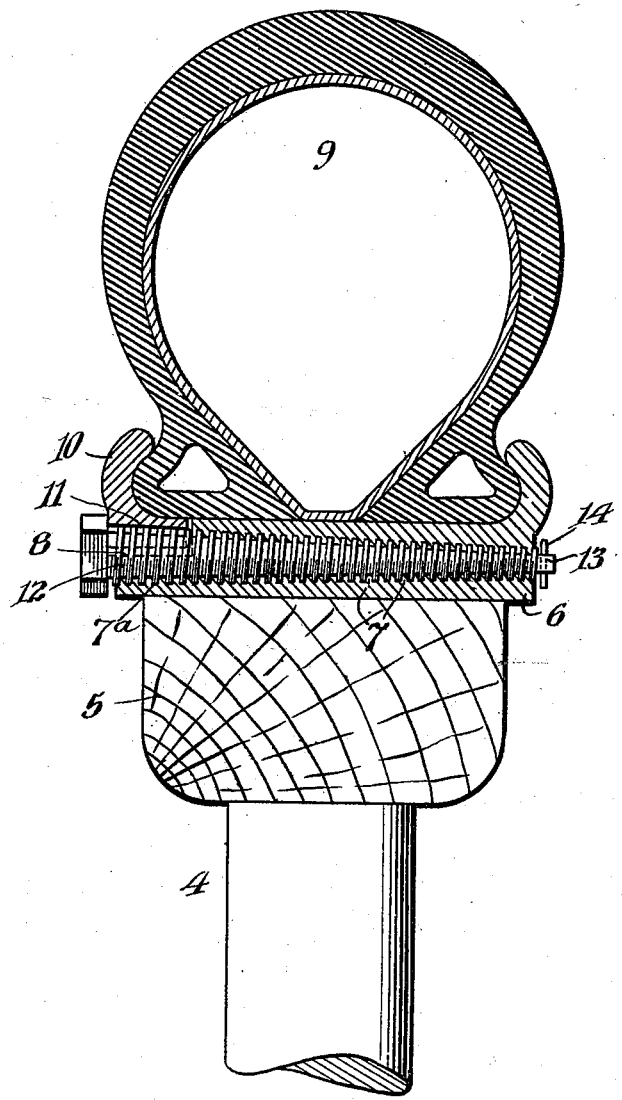

CHARLES B. SINER, OF PHILADELPHIA, PENNSYLVANIA.

RIM FOR TIRES OF MOTOR-VEHICLE WHEELS.

977,844.

Specification of Letters Patent. Patented Dec. 6, 1910.

Original application filed February 3, 1910, Serial No. 541,672. Divided and this application filed March 9, 1910. Serial No. 548,203.

*To all whom it may concern:*

Be it known that I, CHARLES B. SINER, a citizen of the United States, residing at the city of Philadelphia, in the county of Philadelphia and State of Pennsylvania, have invented certain new and useful Improvements in Rims for the Tires of Motor-Vehicle Wheels, of which the following is a specification.

My present invention relates to a separable rim for the tire of a motor vehicle wheel, and in such connection it relates to the particular constructive two-part arrangement of the rim and to the means for securing the parts and wheel tire in connection therewith and of the manner of removing the same therefrom.

The present application is a division of an application for a patent filed by me, under date of February 3d, 1910, Serial No. 541,672.

The nature, scope and characteristic features of my present invention will be more fully understood from the following description taken in connection with the accompanying drawing forming part hereof, in which is shown in vertical section a separable rim, consisting of two parts, one fixed to the felly and the other removably clamping the wheel-tire.

Referring to the drawings, 4 is an ordinary construction of wheel provided with a felly 5, having a flanged separable rim 6, fixed thereto and which rim is offset at 8, and provided therein, at suitable distances apart with tapering openings 7 and recesses 7ª, the walls of which are threaded.

9, is an inflated tire.

10, is a removable or detachable clencher flange, as shown, arranged to register with the offset portion 8, of the rim 6, fixed to the felly 5. The flange 10, is provided with a series of unthreaded recesses 11, registering with the recesses 7ª, of the rim 6, fixed to the said felly 5.

12, is a headed bolt having threads substantially square-shape in cross-section, arranged along the same. This bolt is made tapering to the opposite reduced threaded end and thereat is provided an opening 13, to receive a cotter or other pin 14. Each headed bolt 12, is adapted to engage the recessed threaded and circular tapering portions of the fixed rim 6, to tighten the clencher flange 10 thereof, against the tire 9, to by turning the said bolt 12, in conjunction with the head thereof, hold the two parts of the rim firmly wedged to each other and therewith in proper position the inflated tire, whether a pin 14, becomes disconnected or not from the extremity of any of the bolts 12.

By the foregoing arrangement is permitted a quick withdrawal of a tire, when the same becomes punctured or deflated.

Having thus described the nature and object of my invention, what I claim as new and desire to secure by Letters Patent is:—

In a motor vehicle wheel, a separable rim, consisting of two parts, one fixed to the wheel-felly, having a flange for engaging the wheel-tire, at one edge and a threaded offset or recess at the other edge portion and having beyond the offset or recess thereof, interiorly a tapering threaded bore, the other part formed into a flange for the wheel-tire and having an unthreaded portion arranged to register with the offset or recess of said part and a headed and threaded tapering bolt for lockingly holding the inflated tire in connection with the said separable rim by the flanges thereof and the two parts of said rim wedged to each other.

In witness whereof, I have hereunto set my signature in the presence of two subscribing witnesses.

CHARLES B. SINER.

Witnesses:
THOMAS M. SMITH,
ELISABETH A. SHELDRAKE.